United States Patent Office 3,718,588
Patented Feb. 27, 1973

3,718,588
METHOD FOR REDUCING FRICTION ON CONVEYORS WITH AQUEOUS SALTS OF PHOSPHATE ESTERS
Thomas J. Bellos, Kirkwood, and Franklin E. Mange, St. Louis, Mo., assignors to Petrolite Corporation, Wilmington, Del.
No Drawing. Filed May 13, 1968, Ser. No. 730,214
Int. Cl. C10m 3/40, 3/04
U.S. Cl. 252—32.5    22 Claims

ABSTRACT OF THE DISCLOSURE

Method using lubricant comprising water and a salt of a phosphate ester on conveyors.

---

This invention relates to methods and compositions for reducing friction on conveyors of the type wherein there is relative motion between the conveyor and the articles conveyed thereon, such as where chutes, conveyor belts and the like are used. The compositions employed are salts of phosphate esters.

Reducing friction on conveyor belts is particularly important in canneries and bottling plants at points of entry to continuous sterilizers, labelling machines and the like. At such points, the article, for example, glass bottles, metal cans, and the like tend to pile up and the conveyor must slip beneath them. Various compositions have been used for the purpose of reducing friction between the conveyor and the articles as the conveyor passes beneath them. The reduced friction allows the bottles to slip and thus not tip when there is a pile up or uneven rotation of the belt.

We have now discovered that enhanced reduction in friction can be achieved by employing salts of phosphate esters. We have further discovered that such compositions are capable of forming a supporting layer of wet foam which facilitates the operation by further reducing friction.

The term "salt of a phosphate ester" means a composition derived from ortho phosphoric acid, condensed or polyphosphoric acids or equivalent wherein at least one acid group of the phosphoric acid is esterified with an alcohol group and at least one acid group is in the salt form.

This may be expressed simply as

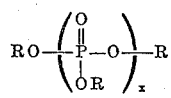

where $x=1$–10, or more, i.e. degree of condensation of the polyphosphoric acid portion. R is an ester group, H or M where M is an amine salt or an alkali metal salt, provided there is at least one ester group and at least one salt group.

The composition should be water soluble or dispersible.

The alcohol moiety may be derived from any suitable alcohol capable of yielding a satisfactory product. These include alkyl, cycloalkyl, aryl, aralkyl, alkaryl, alkarylalkyl, heterocyclic, etc. alcohols. Also included are oxyalkylated alcohols for example $R(OA)_nOH$ where OA is derived from an alkylene oxide and $n$ is an integer for example 1–100, such as 1–50, for example 1–25, but preferably 1–10.

Also included within the scope of this invention are oxyalkylated polyols such as for example glycols, for example $H(OA)_nOH$ which may also form esters of phosphoric acids.

The glycol may be esterified to only one phosphate unit or since it is bifunctional to a plurality of phosphate units with the proviso that the final molecule contains at least one glycol unit and at least one salt unit. In addition the glycol ester molecule may also contain monofunctional alcohol moieties as well as glycol moieties.

$(OA)_n$ is derived from any suitable $\alpha,\beta$-alkylene oxide, for example, alkylene oxides of the formula

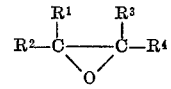

where $R^1$, $R^2$, $R^3$, $R^4$ are hydrogen or a substituted group, for example alkyl, cycloalkyl, aryl, etc., for example ethylene oxide, propylene oxide, butylene oxide, amylene oxide, octylene oxide, styrene oxide, methylstyrene oxide, cyclohexene oxide (where $R^1$ and $R^3$ are joined to form a ring), etc.

Equivalents of alkylene oxides can also be employed, for example alkylene carbonates, i.e. ethylene carbonate, propylene carbonate, butylene carbonate, etc. In addition alkylene oxides of the glycide, methyl glycide, etc. type and their equivalents can also be employed.

$(OA)_n$ denotes (1) homo units for example $$—(OEt)_n—$$

$—(OPr)_n—$, $—(OBu)_n—$, $—(O_nOctyl)_n—$, etc., (2) blocks units, $—(OEt)_a(OPr)_b—$, $—(OEt)_a(OBu)_b—$, $(OPr)_a(OEt)_b(OPr)_c$, $(OEt)_a(OPR)_b(OBu)_c$, etc. where $a+b+c=n$; (3) hetero units containing groups which are random mixtures of more than one oxide $(OEt—OPr)_n$, $(OPr—OBu)_n$, $(OEt—OBu)_n$, wherein the ratio of each oxide to the other is for example 1–99 to 99–1; (4) hetero-homo units for example $$(EtO)_a(EtO—PrO)_b$$

$(EtO)_a(PrO)_b(EtO—PrO)_c$, $(EtO—PrO)_a(BuO)_b$, etc.

Thus, included within the scope of this invention are esters derived from oxyalkylated alcohols, arylols, etc. such as $R(OA)_nOH$ where R is the alcohol or arylol moiety, etc. In addition, polyols such as diols, glycols, glycerols, etc. either oxyalkylated or unoxyalkylated. Thus the esters may be derived from alcohols, ROH, oxyalkylated alcohols $R(OA)_nOH$, glycols HOROH, polyalkyleneether glycols $H(OA)_nOH$, and combinations of any of these.

The salt moiety, M, may be any suitable metallic element such as an alkali metal, e.g. Na, K, Li, etc. or any organic moiety capable of forming a salt such as an amine, etc.

Amines include monoamines, such as primary, secondary and tertiary amines, cyclic amines, etc.; polyamines; cyclic amidines, oxyalkylated amines, etc. capable of forming complexes on salts.

The following are examples of amines:

Monoamines include primary, secondary and tertiary amines $$RNH_2, \underset{H}{RNR'}, \underset{R'''}{R'NR''}$$

where the R's are alkyl, aryl, alkenyl, cycloalkyl alkaryl, alkaryl alkyl, heterocyclic where the R's have, for example 1–30 or more carbons, such as 1–30, but preferably 1–18.

The R's in the above formula can also be joined to yield cyclic amines such as, for example, pyridine, quinoline, isoquinoline, piperiazine, morpholine, etc., C-alkyl derivatives thereof, etc.

Also included are polyamines, for example $$R'_2N\left(\underset{AN}{R'''}\right)_nR''$$

where the R's are hydrogen or a substituted group such as alkyl, alkenyl, etc., where A is a divalent radical for example $(CH_2)_{1-4}$, where $n$ is an integer 1, 2, 3, 4, etc., branched alkylenes for example

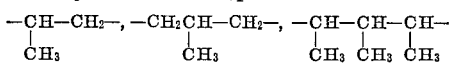

Specific examples include ethylene diamine, diethylene triamine, triethylene tetramine, propylene diamine, dipropylene triamine, tripropylene tetramine, butylene diamine, amino ethyl propylene diamine, amino ethyl butylene diamine, tetramethylene diamine, hexamethylene diamine, etc., $NH_2A(OA)_nNH_2$, etc. derivatives thereof such as

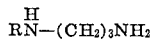

acylated polyamines for example

cyclic amidines, such as imidazolines, tetrahydropyrimidines, for example

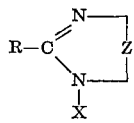

where Z is for example $(CH_2)_{2-3}$, and X is hydrogen, or a substituted group for example

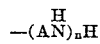

etc.

Also included are oxyalkylated amines for example oxyalkylated derivatives of any of the above amines with $(OA)_n$ groups as in the case of the oxyalkylated alcohols described above.

One type of amine advantageously employed includes alkanolamines, for example, ethanolamine, diethanolamine, triethanolamine, corresponding propanol amines, etc. These are particularly valuable since they are viscosity enhancers which are less adversely susceptible to water hardness, such as magnesium, calcium, etc., ions, etc.

The method of this invention is ideally suited for use with a conveyor carrying glass bottles or metal cans. It may be used in similar situations where it is desired to reduce friction between solid surfaces, for example, where solid objects are moved on a slide.

The compositions of this invention are employed as aqueous solutions or suspensions. The solution is often employed as a water-alcohol mixture. In practice the undiluted product or aqueous solutions having a concentration of from about 0.001 to 95% by weight, such as from about .01% to 50%, for example from about 0.1 to 10%, but preferably from about 0.1 to 5.0% are placed on the conveyor belts. The optimum concentration will vary with the particular composition. These compositions may be prepared from concentrates such as from about 5 to 75% aqueous solution, for example from about 7.5 to 60%, but preferably from about 10 to 50%.

They may be used alone or with other suitable compositions such as soaps, surfactants, etc.

In addition, the composition may contain additional ingredients, such as anti-foaming agents, controlled foaming agents, foam stabilizers, wetting agents, coupling, chelating or solubilizing agents, biocidal agents, such as bactericides, corrosion inhibitors, pH buffers, combinations thereof, etc.

An unique aspect of the present invention is the ability of the salt of a phosphate ester to form a minute amount of wet foam which may or may not be visible to the naked eye. This "wet foam" effect (i.e. the foam contains a high percentage of water per unit area) is achieved by proper hydrophile-hydrophobe balance, i.e. the balance of water-attracting and water-repelling moieties in the final phosphate molecule whether on the alcohol moiety or on the salt moiety so that the desired overall effect is achieved. One method of achieving this is to oxyalkylate an alcohol, phenol, etc., which oxyalkylation may yield a homo-oxyalkylate (only one oxide employed) or a hetero-oxyalkylate (a mixture of more than one oxide may be employed), a block-oxyalkylated (one oxide may be added first and a second oxide may be added second, or these may be done with repeated alternate additions), etc. In general, it is desirable to add oxides or variations of oxides until the oxyalkylated alcohol is both hydrocarbon and water soluble. This oxyalkylated alcohol is then esterified with phosphoric acid (poly) and the proper salt moiety is added so that the final product is water soluble or dispersible. This type of product produces the desired wet foam. $P_2O_5$ and $POCl_3$ may also be used in place of polyphosphoric acid.

In other instances although the oxyalkylated alcohol $R(OA)_n-OH$ itself may be hydrocarbon soluble but water insoluble, the ester and subsequent salt may produce a phosphate-ester salt which is water dispersible and/or water soluble and capable of producing a supporting wet foam layer.

Alternately an unoxyalkylated water-insoluble fatty alcohol may be esterified and water solubility or dispersibility may be imparted through the phosphoric acid moiety and/or the hydrophilic salt moiety so as to yield a supporting foam layer.

Alternately a non-foaming but lubricating phosphate-ester-salt may be compounded with another foam producing compound capable of producing the supporting foam layer.

In summary, the salt of the phosphated ester should (1) be water soluble or dispersible; (2) be capable of forming a sufficient wet-foam supporting layer on the conveyor belt.

These properties may be obtained from the phosphate-ester salt and/or an auxiliary compound capable of producing the supporting foam layer. The product should be relatively non-toxic under conditions of use and biodegradable where required.

Although oxyalkylates are preferable, suitable non-oxyalkylated moieties may be employed. Where oxyalkylates are employed, any variety of combinations of oxides may be employed on the alcohol moiety and/or the salt moiety to achieve the desired effect.

Suitable examples of compositions employed as conveyor belt lubricants are presented in the following table, which illustrates compounds of the general formula

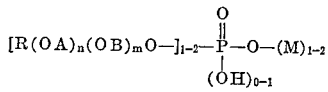

and corresponding glycol esters, where R is the alcohol or phenolic moiety, $(OA)_n$ is the number of moles of the first alkylene oxide added, $(OB)_n$ is the number of moles of the second alkylene oxide added and M is the salt moiety. Where desirable, a third alkylene oxide $(OD)_b$ may also be added which may or may not be the same as OA.

Where a polyphosphoric acid is employed as a reactant, the following reactions may occur.

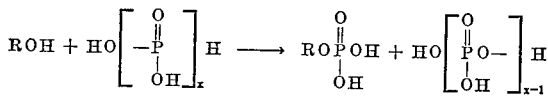

Reaction continues until all of the polyphosphoric acid is consumed. Where glycols are employed the following reaction may occur.

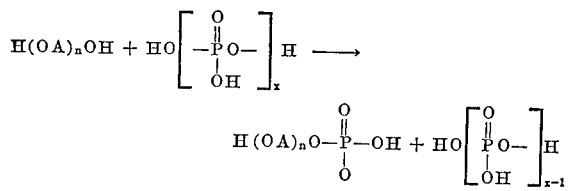

and/or

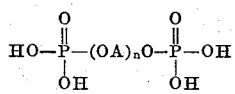

etc.

The following examples are presented for purposes of illustration and not of limitation.

EXAMPLE 1

(1) 428 grams (1 mole)

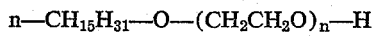

(prepared from equal weights of the pentadecyl alcohol and equal weights of ethylene oxide),
(2) 173 grams (1 mole) polyphosphoric acid The oxyalkylated alcohol is charged to a resin pot and heated to 60° C. under nitrogen. The polyphosphoric acid is added with stirring. After the reactants are thoroughly mixed they are heated slowly for 1 hour to 110° C. and then maintained for 2–4 hours. Upon completion of the reaction this product is cooled to 60° C. and a mixture of isopropyl alcohol/water 50/50 i.e. 100 gms. alcohol/100 gms. water; is added. The water acts to decompose any unreacted polyphosphoric acid to orthophosphoric acid while the alcohol retards gelling in the neutralization step. The product is then neutralized with diethanolamine.

EXAMPLE 2

1045 grams (one theoretical mole) of the block polypropylene-polyethylene glycol of $HO(PrO)_{950}H + 10\%$ EtO based on polypropylene glycol and 173 grams polyphosphoric acid are reacted in the manner of Example 1, to yield the diethanol amine salt of the glycol ester.

Since the following phosphate esters are similarly prepared, they are outlined in the following Table I.

TABLE I

Diethanol Amine Salts of Phosphate Esters of Alcohols and Glycols, and their Use of Conveyor Belt Lubricants

| Ex. | Oxyalkylated alcohol or glycol ||||  Static test, grams to initiate | Dynamic test, seconds to move 30 inches |
|---|---|---|---|---|---|---|
| | Alcohol or glycol | Amount | Alkylene oxide | Amount | | |
| 1 | $CH_3(CH_2)_{13}OH$ | 1 part | EtO | 0.5 parts | 25–35 | 30–50 |
| 2 | $CH_3(CH_2)_{13}OH$ | do | EtO | 1.0 parts | 25–35 | 25–40 |
| 3 | $CH_3(CH_2)_{7-9}OH$ | do | EtO | 0.5 parts | 40–55 | 35–50 |
| 4 | $CH_3(CH_2)_{7-9}OH$ | do | EtO | 0.8 parts | 35–40 | 35–45 |
| 5 | $CH_3(CH_2)_{7-9}OH$ | do | EtO | 1.0 parts | 40–50 | 40–45 |
| 6 | $CH_3(CH_2)_{7-9}OH$ | 1 mole | PrO plus EtO | 1 mole, 3 moles | 35–45 | 35–50 |
| 7 | $CH_3(CH_2)_{7-9}OH$ | do | PrO EtO | 1 mole, 4 moles | 30–35 | 35–45 |
| 8 | $CH_3(CH_2)_{7-9}OH$ | do | PrO EtO | 1 mole, 5 moles | 35–50 | 40–45 |
| 9 | Octylphenol | do | EtO | 3 moles | 40–45 | 40–50 |
| 10 | do | do | EtO | 3 moles | 35–40 | 35–45 |
| 11 | do | do | EtO | 3 moles | 50–60 | 50–55 |
| 12 | $HO(PrO)_{950}H$ | | EtO | 10% of glycol in weight | 60–70 | >60–<90 |
| 13 | $HO(PrO)_{950}H$ | | EtO | 50% of glycol | 90–100 | >90 |
| 14 | $HO(Pr)_{1750}H$ | | EtO | 10% of glycol | 80–85 | >60 |
| 15 | $HO(PrO)_{1750}H$ | | EtO | 40% of glycol | 85–95 | >80–<90 |
| 16 | $HO(PrO)_{1750}H$ | | EtO | 50% of glycol | 100–110 | >90 |

In the above examples the R group of the alcohol moiety preferably has 8–18 carbon atoms and the R of the phenol

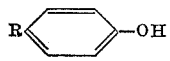

has 4–12 carbon atoms.

The tests in Table I were run in the following manner. A 50% aqueous solution of the compound was prepared and 1 ml. of this 50% solution was placed on the tray of the lubricating test apparatus. A bottle weighing 1 kg. was placed in a standard dish set in the fluid to be tested in the tray. This weight was attached by a string over a wheel to a suspended scale pan. The Static Test records the weight required to be added to the scale pan to initiate movement. The Dynamic Test records the time in seconds it takes to move 30 inches. These tests compare the relative lubrication of the test compounds.

In a typical formulation, it is desirable in preparing solutions to dissolve (1) salts of phosphate esters, (2) a hard water chelating agent such as the sodium salt of ethylene diamine tetra acetic acid (EDTA), etc., and (3) a solvent such as an alcohol, etc. in addition to water, said alcohol acting as a viscosity reducer. Thus, a suitable formulation contains the desired concentration of a salt of a phosphate ester, for example about 5–50%, such as about 30–40% by weight, a chelating agent, for example 5–15% such as 7–10% dissolved in water containing sufficient alcohol to yield the desired viscosity, for example about 5–20% alcohol, such as about 10–15% alcohol, and a quantity of water sufficient to make to total solution to give the desired percentages.

Of course, the above formulation can be varied widely depending on the particular salt of the phosphate ester, the particular system, the type water employed, etc.

The following illustrates a typical conveyor lubricant formulation from which the desired concentrations could be applied to the conveyor belt.

EXAMPLE A

| | Percent |
|---|---|
| Salt of the phosphate ester | 35 |
| Chelating agent (EDTA–Na$_4$) | 8 |
| Viscosity reducer (isopropanol) | 10–15 |
| Water | 47–42 |

The above is exemplary. Resort may be had to such modifications and variations as come within the spirit of the invention and the scope of the appended claims.

Having thus described our invention what we claim as new and desire to obtain by Letters Patent is:

1. The method of reducing friction between surfaces on a conveyor which is characterized by the use of a composition comprising water and a salt of a phosphate ester on at least one of the surfaces between which friction is to be reduced, said salt of a phosphate ester having the formula

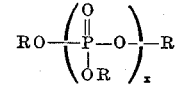

wherein R is a member having at least 8 carbon atoms selected from the group consisting of an oxyalkylated linear alcohol radical, an oxyalkylated phenol radical and an oxyalkylated glycol radical, an organic amine radical and an alkali metal, and x is 1–10, with the proviso that said salt of a phosphate ester has at least one alcohol radical and at least one salt radical.

2. The method of claim 1 wherein said composition includes an alcohol as a viscosity reducing agent.

3. The method of claim 2 wherein the alcohol radical of said salt of a phosphate ester is a member selected from the group consisting of an oxyalkylated linear saturated alcohol radical, an oxyalkylated phenol radical and an oxyalkylated glycol radical.

4. The method of claim 3 wherein the salt radical is an organic amine radical.

5. The method of claim 2 wherein the organic amine radical is an oxyalkylated organic amine radical.

6. The method of claim 5 wherein the oxyalkylated organic amine radical is a dialkanol amine radical.

7. The method of claim 3 wherein the alcohol radical is an oxyalkylated linear saturated alcohol radical, said oxyalkylated linear saturated alcohol being formed from equal parts of pentadecyl alcohol and ethylene oxide.

8. The method of claim 4 wherein the alcohol radical is an oxyalkylated linear saturated alcohol radical, said oxyalkylated linear saturated alcohol being formed from equal weights of pentadecyl alcohol and ethylene oxide.

9. The method of claim 5 wherein the alcohol radical is an oxyalkylated linear saturated alcohol radical, said oxyalkylated linear saturated alcohol being formed from equal weights of pentadecyl alcohol and ethylene oxide.

10. The method of claim 6 wherein the alcohol radical is an oxyalkylated linear saturated alcohol radical, said oxyalkylated linear saturated alcohol being formed from equal weights of pentadecyl alcohol and ethylene oxide.

11. The method of claim 3 wherein the alcohol radical is an oxyalkylated glycol radical of the block polypropylene-polyethylene glycol of $HO(PrO)_{950}H$ plus 10% EtO based on polypropylene glycol and the salt radical is the diethanol amine radical.

12. The method of claim 3 wherein the alcohol radical is an oxyalkylated phenol moiety and the phenyl radical of the oxyalkylated phenol radical is

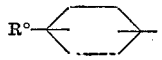

wherein R° is an alkyl group having 4–12 carbon atoms.

13. The method of claim 12 wherein the salt radical is a dialkanolamine radical.

14. The method of claim 2 wherein said composition includes a chelating agent.

15. The method of claim 3 wherein the alcohol radical is oxyalkylated linear saturated alcohol radical, said oxyalkylated linear saturated alcohol being formed from one part by weight of tetradecyl alcohol and 0.5 part by weight of ethylene oxide or from equal weights of tetradecyl alcohol and ethylene oxide.

16. The method of claim 15 wherein said oxyalkylated linear saturated alcohol is formed from one part by weight of tetradecyl alcohol and 0.5 part by weight of ethylene oxide.

17. The method of claim 16 wherein the salt radical is a diethanolamine radical.

18. The method of claim 17 wherein the viscosity reducing alcohol agent is isopropyl alcohol.

19. The method of claim 3 wherein the alcohol radical is an oxyalkylated linear saturated alcohol radical, said oxyalkylated linear saturated alcohol being selected from the group consisting of
    (1) one part by weight of $CH_3(CH_2)_{7-9}OH$ and 0.5 part by weight of ethylene oxide,
    (2) one part by weight of $CH_3(CH_2)_{7-9}OH$ and 0.8 part by weight of ethylene oxide,
    (3) equal weights of $CH_3(CH_2)_{7-9}OH$ and ethylene oxide,
    (4) one mole $CH_3(CH_2)_{7-9}OH$ and one mole propylene oxide and three moles ethylene oxide,
    (5) one mole $CH_3(CH_2)_{7-9}OH$ and one mole propylene oxide and four moles ethylene oxide, and
    (6) one mole $CH_3(CH_2)_{7-9}OH$ and one mole propylene oxide and five moles ethylene oxide.

20. The method of claim 19 wherein said oxyalkylated linear saturated alcohol is formed from one part by weight of $CH_3(CH_2)_{7-9}OH$ and 0.5 part by weight of ethylene oxide.

21. The method of claim 20 wherein the salt radical is a diethanolamine radical.

22. The method of claim 21 wherein the viscosity reducing alcohol agent is isopropyl alcohol.

References Cited

UNITED STATES PATENTS

| | | | |
|---|---|---|---|
| 3,033,889 | 5/1962 | Chiddix et al. | 252—32.5 |
| 3,088,910 | 5/1963 | Rudel | 252—32.5 |
| 3,169,923 | 2/1965 | Guarnaccib et al. | 252—32.5 |
| 3,203,895 | 8/1965 | Latos et al. | 252—32.5 |
| 3,203,896 | 8/1965 | Latos et al. | 252—32.5 |
| 3,277,001 | 10/1966 | Fischer et al. | 252—32.5 |
| 3,310,489 | 3/1967 | Davis | 252—32.5 |
| 3,311,555 | 3/1967 | Ehrlenspiel et al. | 252—32.5 |
| 3,408,843 | 11/1968 | Treat | 252—32.5 |
| 3,496,104 | 2/1970 | Shimada et al. | 252—32.5 |
| 3,531,411 | 9/1970 | Benson et al. | 252—32.5 |
| 3,574,100 | 4/1971 | Wetmore | 252—32.5 |

DANIEL E. WYMAN, Primary Examiner

I. VAUGHN, Assistant Examiner

U.S. Cl. X.R.

252—49.5